Patented Mar. 30, 1954

2,673,877

UNITED STATES PATENT OFFICE 2,673,877

PREPARATION OF CHLORPHENYL-DIMETHYL-UREAS

Wallace W. Thompson, New Castle, Del., assignor to E. I. du Pont de Nemours and Company, Wilmington, Del., a corporation of Delaware No Drawing. Application October 26, 1951,
Serial No. 253,480

8 Claims. (Cl. 260—553)

This invention relates to processes for the manufacture of 3-(chlorophenyl)-1,1-dimethylurea in which there are from one to three chlorine substituents on the phenyl radical, one chlorine substituent being in the para position to the urea nitrogen atom to which the radical is linked. The compounds are represented by the formula (1) 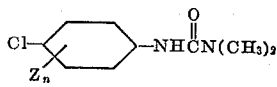

where Z is hydrogen or chlorine and $n$ is 1 or 2. In other words, the compounds are 3-(p-chlorophenyl)-1,1-dimethylurea, 3-(x,4-dichlorophenyl)-1,1-dimethylurea and 3-(x,y,4-trichlorophenyl)-1,1-dimethylurea where $x$ and $y$ are numbers selected from the groups 2, 3, 5, and 6, $x$ being a number different from $y$ in the trichloro compounds.

Two reactions are to be considered in connection with processes of the invention: first, the "urea reaction" which is illustrated by the following typical equation showing specific reactants (2) 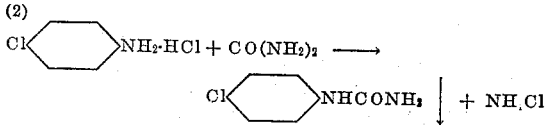

and then the "dimethylamine reaction" which is illustrated by the following typical equation (3) 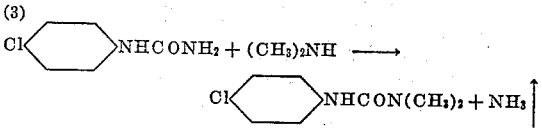

In carrying out the "urea reaction" according to processes of this invention, urea is heated in aqueous solution with an acid salt of a chloroaniline having one to three chlorine substituents, one chlorine being in the para position. In other words, the urea is heated with a mono-, di-, or trichloroaniline in which one of the chlorine atoms is para to the amino group.

Illustrative of chloroanilines, the acid salts of which are employed in processes of the invention, are for example, p-chloroaniline, 3,4-dichloroaniline, 2,4-dichloroaniline, 2,4,6-trichloroaniline and 3,4,5-trichloroaniline.

The urea reaction is rather sluggish at temperatures below about 70° C. and the urea-chloroaniline salt solution is heated at 70° C. to 105° C. and, preferably, at 90° C. to 105° C. to effect the reaction. The reaction is suitably carried out at approximately atmospheric pressure altho increased pressure can be used if desired. It is undesirable, however, to operate at temperatures substantially in excess of about 105° C.

Various acid addition salts of the chloroanilines can be used in the urea reaction. The acids can be inorganic such as hydrochloric, sulfuric, and phosphoric, or organic such as formic, acetic, and lactic. The amine acid salt can be charged into the reaction vessel intially as the reactant, or alternatively the chloroaniline can be charged and the salt generated in situ by addition of the acid. For best results, the chloroaniline acid salt used should be soluble in water at least to the extent of 5 grams per 100 cc. of water at 100° C.

In order to have a reasonably rapid reaction rate, it is preferred to employ at least two mols of urea for each mol of the chloroaniline acid salt and preferably about four mols of urea per mol of the acid salt. If the chloroaniline acid salt is generated in situ, as by the addition of an acid such as hydrochloric acid to a chloroaniline in the reacting mass, then at least one mol of hydrogen chloride is added for each mol of the chloroaniline or urea. There is no need to use more than about an equimolar amount of the acid but there is no harm in using a moderate excess.

The chloroaniline acid salt reacts with urea in the hot aqueous mass to form the corresponding chlorophenylurea. The chlorophenylureas produced according to the processes of this invention are all quite water insoluble and thus they precipitate from the fluid reacting mass as formed and are thereby effectively prevented from undergoing substantial decomposition or further reaction to give undesired by-products and consequent reduced yields.

The amount of water used in the "urea reaction" can be varied widely and is not critical except that enough should be used to keep the reacting mass sufficiently fluid to permit continued agitation. In other words, enough water should be used to prevent formation of a thick unmanageable slurry or suspension of the chlorophenylurea product in the reacting mass.

Upon completion of the urea reaction, the precipitated chlorophenylurea product is separated from its suspension in the reaction mass. The separation is conveniently effected, for example, by filtering or centrifuging. The separated chlorophenylurea is then used in the subsequent "dimethylamine reaction." The dimethylamine reaction proceeds more favorably the lower the amount of water associated with the chlorophenylurea separated from the reaction mass of the urea reaction and, accordingly, it is preferred to dry the chlorophenylurea before using it in the subsequent step.

In carrying out the "dimethylamine reaction" according to the processes of this invention, a chlorophenylurea of the class obtained by the above described urea reaction is heated in an inert solvent with an excess of dimethylamine at a temperature of 135° C. to 225° C. A chlorophenyl dimethylurea product of Formula 1 above is formed in the solvent. Ammonia is formed as a by-product of the reaction and is removed from the reacting mass substantially as fast as it is formed.

The solvent used in the dimethylamine reaction can be any liquid that will serve as a solvent for the chlorophenyl dimethylurea product and does not react with such product or with the chlorophenylurea or dimethylamine reactants under the conditions employed.

The "dimethylamine reaction" can be carried out at any convenient pressure, preferably about atmospheric or super-atmospheric pressure, and the solvent selected is preferably one that will boil in about the range of 135° C. to 225° C. at the pressure used. Thus, if the dimethylamine reaction is carried out at about atmospheric pressure, solvents, for example, such as dimethylformamide, o-dichlorobenzene and anisole can be used. In operating at higher pressures, lower boiling solvents such as, for example, benzene, toluene, xylene, and ethyl acetate are suitable.

The chlorophenylurea reactant, the solvent, and the dimethylamine are brought together in any convenient manner to effect solution of at least part, and preferably all, of the chlorophenylurea in the solvent at the reaction temperature of 135° C. to 225° C. Thus, for example, the chlorophenylurea and dimethylamine can be mixed in the solvent and the mixture then heated to the reaction temperature. Alternatively, the chlorophenylurea and solvent can be mixed at any convenient temperature and heated to the reaction temperature to effect solution of the chlorophenylurea, the dimethylamine being added thruout the process, or at any time, or during any portion of the cycle.

The dimethylamine reactant is used in excess of the stoichiometric amount required to react with the chlorophenylurea to give the chlorophenyl dimethylurea product. Amounts, for example, in the order of 1.25 to 2 mols of dimethylamine per mol of the chlorophenylurea are suitable. For best results, free dimethylamine is maintained in the reacting mass thruout the reaction period regardless of the manner of dimethylamine addition. By this, I mean that sufficient dimethylamine is added either initially, or intermittently, or continuously to provide unreacted dimethylamine in the reacting mass available for reaction with the chlorophenylurea at substantially all times during the reaction period; in other words, at no substantial time is the reacting mass permitted to be completely depleted of available unreacted dimethylamine for reaction with the chlorophenylurea.

As a minimum dimethylamine concentration for operation under the latter preferred method, the reacting mixture should contain at least 0.01% by weight free dimethylamine thruout the reaction period. This condition is preferably maintained by continuously adding dimethylamine to the reacting mass in amounts such that some dimethylamine passes thru the mass without reacting. In this manner, sufficient unreacted dimethylamine remains dissolved or entrained in the reacting mass to provide at least the desired minimum concentration.

As the dimethylamine reaction proceeds, a chlorophenyl dimethylurea of Formula 1 is formed in the solvent and ammonia is formed as a by-product.

According to the processes of this invention, the ammonia is removed from the reacting mass substantially as fast as it is formed. This can be done, for example, by sweeping the ammonia from the reacting mass by bubbling an inert gas thru the mass to purge the mass of the ammonia, or by generating a vapor in the reacting mass to serve the same purpose.

Preferably the reacting mass is maintained in an ebullient state by keeping it at a temperature (within the range of 135° C. to 225° C. as previously described) at which the solvent in the mass will boil. The bubbles of vaporized solvent in their passage thru the reacting mass act to sweep out the by-product ammonia. The vapors from the reacting mass are then preferably cooled sufficiently to condense the vaporized solvent but to permit the ammonia to pass thru the condenser and be removed from the system, and the condensed solvent is returned to the reacting mass. In other words, the reacting mass is maintained under reflux conditions with respect to the solvent.

The course of the dimethylamine reaction is easily followed by measuring the amount of ammonia gas liberated. For best yields, the process is continued until ammonia ceases to form in substantial amounts.

At completion of the reaction, the liquid mass in the reactor consists essentially of a solution of the chlorophenyl dimethylurea in the solvent, and in some cases, depending upon the kind and amount of solvent used, an amount of solid chlorophenyl dimethylurea product.

The product is recovered from its solution or mixture with the solvent by conventional means, for example, by crystallizing the product therefrom, or by steam distilling the solvent from the product.

In order that the invention may be better understood, the following examples are given as illustrative in addition to those numerous examples which have already been described.

*Example 1*

240 parts by weight of the urea is dissolved in 800 parts by weight water. 127.5 parts by weight of p-chloroaniline and 100 parts by weight of 37% hydrochloric acid are added to the solution. The resulting mixture is heated for about 6 hours at a temperature just below the boiling point of the mixture.

Para-chlorophenylurea precipitates as it is formed and therefore an increasingly thicker suspension or slurry of p-chlorophenylurea is obtained as the reaction proceeds. At the end of the heating period, the slurry is filtered to remove the p-chlorophenylurea formed and the material is dried.

The dried p-chlorophenylurea is then slurried in about 990 parts by weight o-dichlorobenzene and the mixture is gradually heated. Gaseous dimethylamine is slowly bubbled into the mixture, starting when the temperature of the p-chlorophenylurea-dichlorobenzene mixture is about 80° C.

In about 30 minutes, the reaction mass is heated to the reflux temperature (temperature of reacting mass is about 180° C.). During this heating period, a total of 9 parts by weight of dimethylamine are added.

Heating at reflux conditions is continued for 3½ hours. During all of this period, gaseous dimethylamine is bubbled into the reaction mass while the mass is agitated to give good gas dispersion. The dimethylamine is fed at a rate that exceeds its rate of consumption in the reaction. Thus, the dimethylamine is present in excess in the reacting mass at all times and a portion of it passes thru the reacting mass unchanged. Thruout the reaction, the ammonia formed is removed from the reaction vessel as it is liberated from the liquid reacting mass.

At the end of the reaction cycle, the reacting mass consists predominantly of a solution of the product 3-(p-chlorophenyl)-1,1-dimethylurea in o-dichlorobenzene. The solution is cooled to crystallize the product therefrom and the product is removed by filtration and dried. 125 parts by weight of 3-(p-chlorophenyl)-1,1-dimethylurea is obtained having a melting point of 168–70° C.

Example 2

264 parts by weight of urea is dissolved in 572 parts by weight of water. 140 parts by weight of p-chloroaniline is added to the solution and stirred therein to form a suspension or slurry. A mixture of 216 parts by weight of 37% hydrochloric acid and 36 parts by weight of water is added to the suspension over a period of two hours while maintaining the mixture at reflux (about 100° C.).

During the acid addition, p-chlorophenylurea precipitates as it is formed and an increasingly thicker slurry is obtained as the reaction proceeds. At the end of the hydrochloric acid addition, the slurry is filtered and the recovered solid is washed with 236 parts by weight of water and dried.

The dried p-chlorophenylurea is slurried with 600 parts by weight of anisole and the mixture heated. Gaseous dimethylamine is slowly bubbled into the mixture starting when the temperature of the anisole-p-chlorophenylurea mixture is about 80° C. In about 15 minutes, the reaction mass is heated to reflux (temperature of the reacting mass is about 155°. During this heating period, a total of 90 parts by weight of dimethylamine are added. The p-chlorophenylurea dissolves in the anisole.

Heating at reflux is continued for 4 hours. During all this period, gaseous dimethylamine is bubbled into the reacting mass while the mass is agitated to give good gas dispersion. The dimethylamine is fed at a rate that exceeds its rate of consumption in the reaction. Thus, the dimethylamine is present in excess in the reacting mass at all times and a portion of the dimethylamine passes thru the reacting mass unchanged. Thruout the reaction, the ammonia formed is removed from the reactor as it is liberated from the reacting mass.

At the end of the reaction cycle, the reaction mass consists essentially of a solution of the product 3-(p-chlorophenyl)-1,1-dimethylurea in anisole. The anisole is removed by steam distillation and on cooling and filtering the residue, 165 parts by weight of 3-(p-chlorophenyl)-1,1-dimethylurea is obtained having a melting point of 165–8° C.

While the above detailed examples have related to preparation of a preferred compound, namely, 3 - (p - chlorophenyl) - 1,1 - dimethylurea, those skilled in the art will appreciate that the processes described are equally applicable, by substitution of an appropriate chloroaniline reactant, to the manufacture of other chlorophenyl dimethylureas of formula (1) such as, for example, the compounds 3-(3,4-dichlorophenyl)-1,1-dimethylurea, 3-(2,4-dichlorophenyl)-1,1-dimethylurea, 3 - (2,4,6 - trichlorophenyl)-3,3-dimethylurea, and 3-(3,4,5-trichlorophenyl)-1,1-dimethylurea.

I claim:

1. In a process for the manufacture of a 3-(chlorophenyl)-1,1-dimethylurea in which there are 1 to 3 chlorine substituents on the phenyl radical, one chlorine substituent being in the para position to the urea nitrogen atom to which the radical is linked, the steps comprising heating at a temperature of 70° C. to 105° C. an aqueous solution of urea and an acid salt of a chloroaniline having one to three chlorine substituents, one chlorine being in the para position, at least two mols of urea being used for each mol of the chloroaniline salt, whereby a chlorophenylurea forms and precipitates from the solution, separating said chlorophenylurea precipitate from the reaction mass, heating the separated chlorophenylurea in solution in an inert solvent with an excess of dimethylamine at a temperature of 135° C. to 225° C., whereby the aforementioned chlorophenyl dimethylurea product and by-product ammonia are formed in a reacting mass, and removing said ammonia from the reacting mass substantially as fast as it is formed.

2. In a process for the manufacture of a 3-(chlorophenyl)-1,1-dimethylurea in which there are 1 to 3 chlorine substituents on the phenyl radical, one chlorine substituent being in the para position to the urea nitrogen atom to which the radical is linked, the steps comprising heating at a temperature of 70° C. to 105° C. an aqueous solution of urea and an acid salt of a chloroaniline having one to three chlorine substituents, one chlorine being in the para position, at least two mols of urea being used for each mol of the chloroaniline salt, whereby a chlorophenylurea forms and precipitates from the solution, separating said chlorophenylurea precipitate from the reaction mass, dissolving the separated chlorophenylurea in an inert solvent and heating the solution of the chlorophenylurea with excess dimethylamine at a temperature between 135° C. and 225° C. and at a pressure such that the heated mass will be in an ebullient state, whereby the aforementioned chlorophenyl dimethylurea product is formed in the solvent and by-product ammonia is swept from the reacting mass substantially as fast as it is formed by the action of the vapors of the solvent formed in and liberated from the reacting mass.

3. In a process for the manufacture of a 3-(chlorophenyl)-1,1-dimethylurea in which there are 1 to 3 chlorine substituents on the phenyl radical, one chlorine substituent being in the para position to the urea nitrogen atom to which the radical is linked, the steps comprising adding aqueous hydrogen chloride solution gradually to a mixture in water of urea and a chloroaniline having one to three chlorine substituents one chlorine being in the para position, while maintaining the mixture at a temperature of 90° C. to 105° C., at least two mols of urea and at least one mol of hydrogen chloride being used for each mol of the chloroaniline, whereby a chlorophenylurea forms and precipitates from the mixture, dissolving the separated chlorophenyl urea in an inert solvent having a boiling point in the range of 135° C. to 225° C., heating the solution to cause the solvent to boil and to give an ebullient reacting mass, gradually introducing dimethylamine into said ebullient mass, whereby the chlorophenyl dimethylurea product is formed in the reacting mass and dissolves in the liquid solvent and by-product ammonia is swept from the mass by the action of solvent vapors formed in and liberated therefrom, continuing the introduction of dimethylamine into the ebullient reacting mass at least until ammonia ceases to form in substantial amount, and then separating the chlorophenyl dimethylurea product from its solution in the solvent.

4. In a process for the manufacture of 3-(p-chlorophenyl)-1,1-dimethylurea, the steps comprising heating at a temperature of 70° C. to 105° C. an aqueous solution of urea and an acid salt of p-chloroaniline, at least two mols of urea being used for each mol of p-chloroaniline salt, whereby p-chlorophenylurea forms and precipitates from the solution, separating said p-chlorophenylurea precipitate from the reaction mass, heating the separated p-chlorophenylurea in solution in an inert solvent with an excess of dimethylamine at a temperature of 135° C. to 225° C., whereby the aforementioned 3-(p-chlorophenyl)-1,1-dimethylurea product and by-product ammonia are formed in a reacting mass, and removing said ammonia from the reacting mass substantially as fast as it is formed.

5. In a process for the manufacture of 3-(p-chlorophenyl)-1,1-dimethylurea, the steps comprising heating at a temperature of 70° C. to 105° C. an aqueous solution of urea and an acid salt of p-chloroaniline, at least two mols of urea being used for each mol of p-chloroaniline salt, whereby p-chlorophenylurea forms and precipitates from the solution, separating said p-chlorophenylurea precipitate from the reaction mass, dissolving separated p-chlorophenylurea in an inert solvent and heating the solution of the p-chlorophenylurea with excess dimethylamine at a temperature between 135° C. and 225° C. and at a pressure such that the heated mass will be in an ebullient state, whereby the aforementioned 3-(p-chlorophenyl)-1,1-dimethylurea product is formed in the solvent and by-product ammonia is swept from the reacting mass substantially as fast as it is formed by the action of the vapors of the solvent formed in and liberated from the reacting mass.

6. In a process for the manufacture of 3-(p-chlorophenyl)-1,1-dimethylurea, the steps comprising adding aqueous hydrogen chloride solution gradually to a mixture in water of urea and p-chloroaniline while maintaining the mixture at a temperature of 90° C. to 105° C., at least two mols of urea and at least one mol of hydrogen chloride being used for each mol of p-chloroaniline, whereby p-chlorophenylurea forms and precipitates from the mixture, dissolving separated p-chlorophenylurea in an inert solvent having a boiling point in the range of 135° C. to 225° C., heating the solution to cause the solvent to boil and to give an ebullient mass, gradually introducing dimethylamine into said ebullient mass, whereby the 3-(p-chlorophenyl)-1,1-dimethylurea product is formed in the reacting mass and dissolves in the liquid solvent and by-product ammonia is swept from the mass by the action of solvent vapors formed in and liberated therefrom, continuing the introduction of dimethylamine into the ebullient reacting mass at least until ammonia ceases to form in substantial amount, and then separating the 3-(p-chlorophenyl)-1,1-dimethylurea product from its solution in the solvent.

7. In a process for the manufacture of a 3-(chlorophenyl)-1,1-dimethylurea in which there are 1 to 3 chlorine substituents on the phenyl radical, one chlorine substituent being in the para position to the urea nitrogen atom to which the radical is linked, the steps comprising heating in solution in an inert solvent with an excess of dimethylamine at a temperature of 135° C. to 225° C. a chlorophenylurea having 1 to 3 chlorine substituents on the phenyl ring, one chlorine being in the para position, whereby the aforementioned chlorophenyl dimethylurea product and by-product ammonia are formed in a reacting mass, and removing said ammonia from the reacting mass substantially as fast as it is formed.

8. In a process for the manufacture of 3-(p-chlorophenyl)-1,1-dimethylurea, the steps comprising dissolving p-chlorophenylurea in an inert solvent having a boiling point in the range of 135° C. to 225° C., heating the solution to cause the solvent to boil and to give an ebullient mass, gradually introducing dimethylamine into said ebullient mass whereby the 3-(p-chlorophenyl)-1,1-dimethylurea product is formed in the reacting mass and dissolves in the liquid solvent and by-product ammonia is swept from the mass by the action of solvent vapors formed in and liberated therefrom, continuing the introduction of dimethylamine into the ebullient reacting mass at least until ammonia ceases to form in substantial amount, and then separating the 3-(p-chlorophenyl)-1,1-dimethylurea product from its solution in the solvent.

WALLACE W. THOMPSON.

References Cited in the file of this patent

UNITED STATES PATENTS

| Number | Name | Date |
|---|---|---|
| 1,617,847 | Heinze | Feb. 15, 1927 |
| 1,785,730 | Davis | Dec. 23, 1930 |
| 2,203,506 | Piggott et al. | June 4, 1940 |
| 2,253,528 | Olin | Aug. 26, 1941 |
| 2,257,717 | Olin | Sept. 30, 1941 |
| 2,503,797 | Brunner | Apr. 11, 1950 |